(12) United States Patent
Joyce

(10) Patent No.: US 6,304,322 B1
(45) Date of Patent: Oct. 16, 2001

(54) METHOD FOR QUALITY ASSURANCE TESTING OF FIBER-OPTIC LASER MODULES

(75) Inventor: William Baxter Joyce, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/199,093

(22) Filed: Nov. 24, 1998

(51) Int. Cl.[7] .............................. G01N 21/00; G02B 6/36
(52) U.S. Cl. ........................ 356/73.1; 356/123; 385/88
(58) Field of Search .................................. 356/73.1, 153, 356/123; 385/93, 88

(56) References Cited

U.S. PATENT DOCUMENTS

| | | | | |
|---|---|---|---|---|
| 5,111,522 | * | 5/1992 | Chaoui et al. | 385/92 |
| 5,673,350 | * | 9/1997 | Song et al. | 385/93 |
| 5,854,869 | * | 12/1998 | Joyce | 385/92 |
| 5,963,695 | * | 10/1999 | Joyce | 385/88 |

* cited by examiner

Primary Examiner—Frank G. Font
Assistant Examiner—Roy M. Punnoose
(74) Attorney, Agent, or Firm—Jean-Marc Zimmerman

(57) ABSTRACT

A method for testing the reliability of fiber-optic laser modules by determining the change in position over time of the focal point of the fiber tip relative to the laser, wherein the coupling efficiency and influence coefficients of the laser module are used to determine whether the focal point of the fiber tip is moving relative to the laser at an unacceptable rate of displacement such that the laser module is likely to malfunction and is therefore unacceptable for use.

20 Claims, 3 Drawing Sheets

METHOD FOR QUALITY ASSURANCE TESTING OF FIBER-OPTIC LASER MODULES

FIELD OF THE INVENTION

This invention relates to quality assurance testing of fiber-optic laser modules, and more particularly to a method for measuring the change in position over time of the focal point of an optical fiber tip relative to a laser in order to determine which modules are likely to malfunction and should therefore not be used.

BACKGROUND OF THE INVENTION

Lasers are widely used today in various communications systems including in fiber-optic communications systems laid across large bodies of water. In such systems, laser modules are positioned underwater at various points along the fiber-optic cable to amplify the transmitted signals, thereby enabling such signals to be transmitted over long distances. However, when one of these laser modules malfunctions, millions of dollars must typically be expended to replace the faulty module since a properly manned and equipped ship must be launched to do so. In addition, millions of dollars may also be lost since the communications system can not generate revenue when it is off line as a result of the malfunctioning module. Accordingly, it is important that laser modules selected for use operate according to specification and not malfunction.

Towards this end, companies typically test fabricated fiber-optic laser modules to determine which modules are likely to malfunction before their projected lifetime and should therefore not be used. Conventional methods employed for such tests typically analyze the change over time in the coupling efficiency, i.e. power out, of each laser module during a burn-in period. However, such conventional methods suffer from a significant drawback. Specifically, while analyzing the change in the coupling efficiency will identify those modules which have already begun to malfunction, such testing will not accurately identify those modules which, although performing according to specification at the time of the test, are likely to malfunction in the future because the fiber tip has begun to move relative to the laser at an unacceptable rate of displacement It is therefore, an object of the present invention to provide an improved method for quality assurance testing of fiber-optic laser modules which overcomes the foregoing drawback to more reliably determine which laser modules are likely to malfunction and should therefore not be used.

SUMMARY OF INVENTION

A method for testing the quality and reliability of fiber-optic laser modules, wherein the change in position over time of the focal point of the fiber tip relative to the laser is analyzed during a bum-in period to determine which laser modules are likely to malfunction before their projected lifetime and are therefore unacceptable for use. The method uses the coupling efficiency and influence coefficients of the laser module to determine whether the focal point of the fiber is moving relative to the laser at an unacceptable rate of displacement indicating that the laser module is likely to malfunction at a later time.

DETAILED DESCRIPTION OF THE INVENTION

Figure 1:
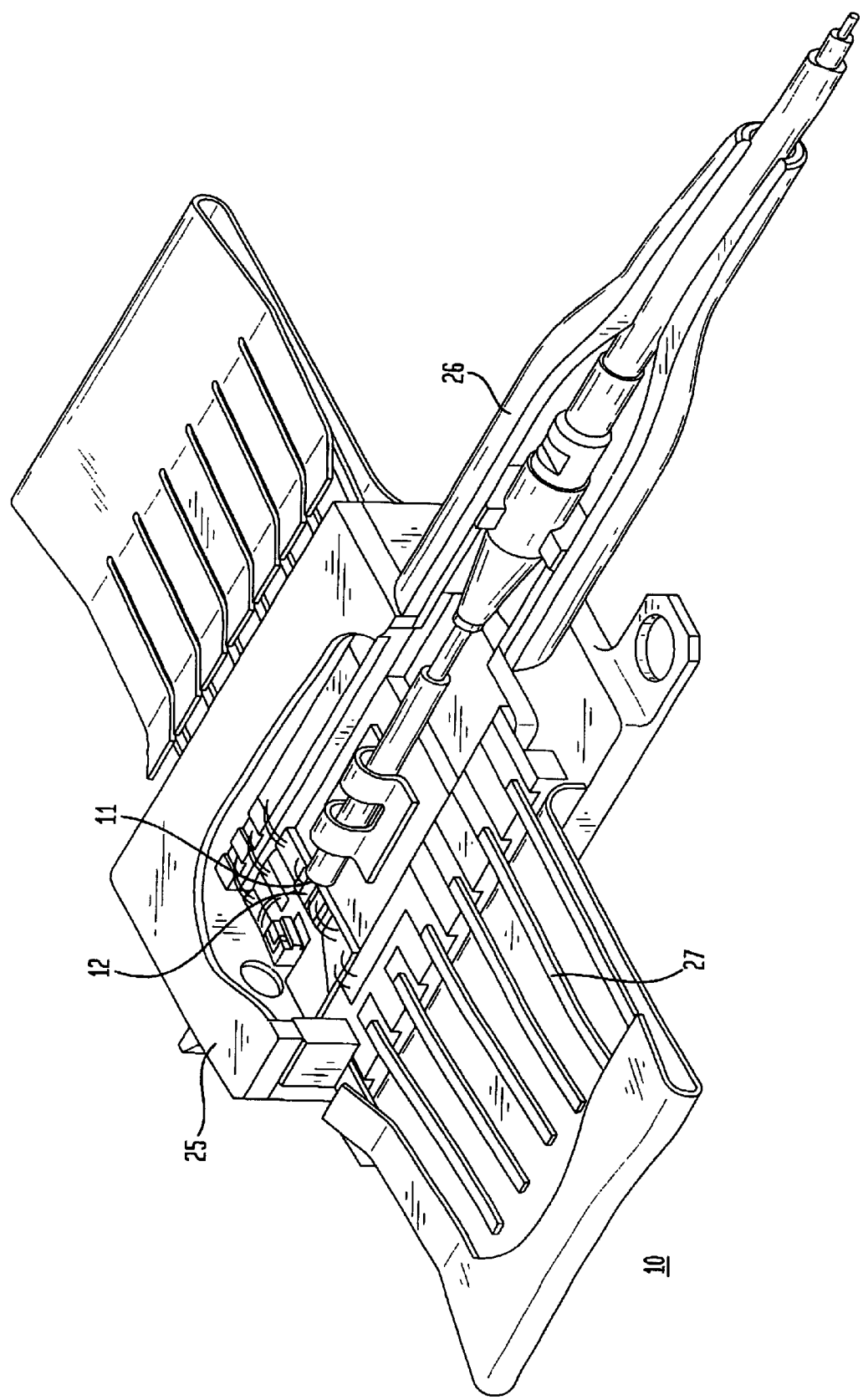
FIG. 1 shows a cutaway view of a fiber-optic laser module which can be tested using the method of the present invention.

The following detailed description relates to a preferred embodiment of a quality assurance testing method for determining whether a fiber-optic laser module is acceptable for use. Referring to FIG. 1 there is shown a fiber-optic laser module 10 which can be examined using the method of the present invention.

Figure 2:
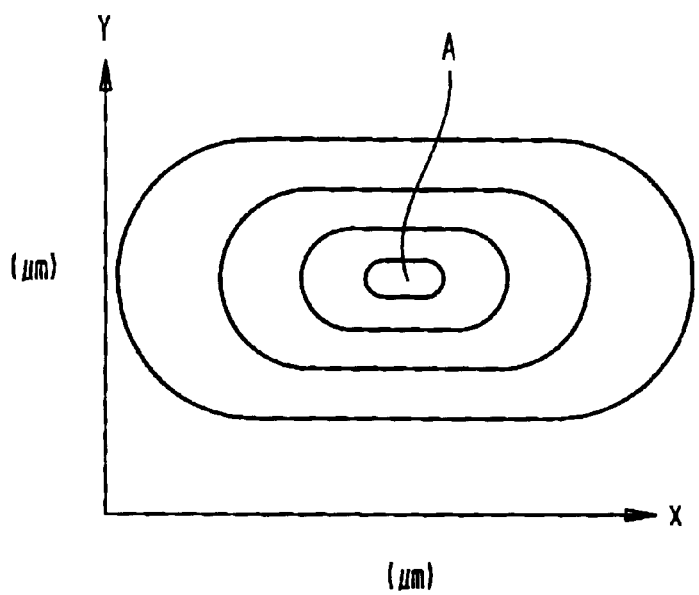
FIG. 2 shows a plot of the contours of power for a conventional fiber-optic laser, wherein displacement ($\mu$m) of the focal point of an optical fiber tip relative to the laser in the x plane is plotted versus displacement ($\mu$m) of the focal point of the fiber tip relative to the laser in the y plane, and wherein each contour line emanating outwards from the center of the plot represents a progressively decreasing coupling efficiency (mW) of the fiber tip and laser.

In order to use the method of the presente invention, both a plurality of contourr of power for optical fiber 28 and laser 12, and plurality of influence coefficients for fiber-optic laser module 10 must first be determined. The contours of power are determined by directing light from laser 12 towards the focal point of the tip optical fiber 28, displacing the focal point of fiber tip 11 in the x and planes rtelative to laser 12, and then plotting the resulting changes in coupling efficiency. To determine these contours, the focal point of optical fiber 28 and laser 12 need not be assembled in module 10. FIG. 2 shows a plot of such contours, wherein the displacement ($\mu$m) of the focal point of fiber tip 11 relative to laser 12 in the x plane is plotted versus displacement ($\mu$m)of the focal point of fiber tip 11 relative to laser 12 in the y plane y plane, and wherein each counter line emanating outwards from the center of the plot represents a progressively decreasing coupling efficiency (mW) of the focal point of fiber tip 11 and laser 12.

The influence coefficients are the ratios of module deformation to focal point motion. Such coefficients are determined by elastically deforming fiber-optic laser module 10 in a controlled manner by a known displacement and observing the resulting change in the coupling efficiency of module 10. This deformation can be either static or dynamic in nature. The influence coefficients can be measured either directly by cutting an inspection hole in laser module 10 and using a microscope to observe the movement of fiber tip 11 as laser module 10 is deformed, or alternatively by using finite element analysis (FEA) to simulate such direct measurement The influence coefficients can also be determined experimentally if the power contours and the symmetry of module 10 are known. The coefficients for laser module 10 are determined by correlating each change in displacement of the focal point of fiber tip 11 with a corresponding module deformation. Each different deformation of laser module 10 results in a different influence coefficient. While such coefficients differ for each different laser module design, they are nearly identical for each separate laser module of the same design.

Figure 3:
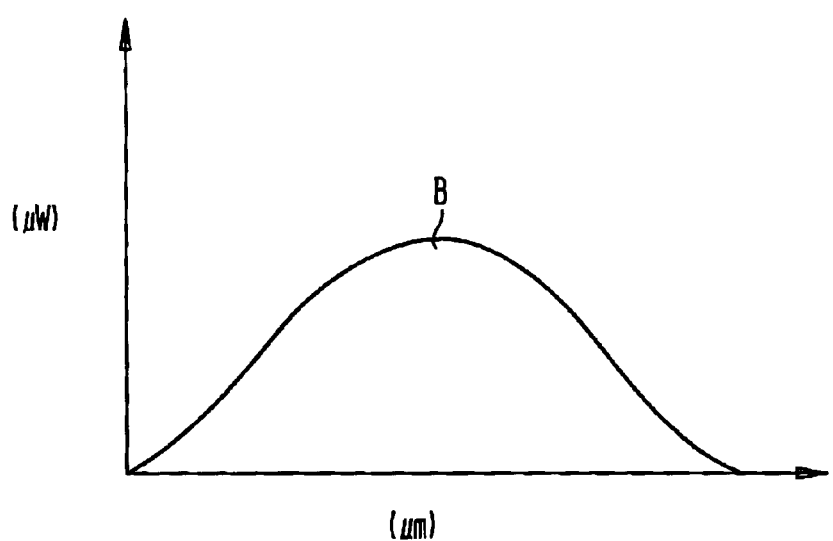
FIG. 3 shows a plot of the coupling efficiency of a conventional fiber-optic laser module, wherein power (mW) is plotted versus displacement ($\mu$m) of the fiber tip relative to the laser.

FIG. 3 shows a plot of the coupling efficiency for fiber-optic laser module 10, wherein power (mW) is plotted versus displacement (μm) of the focal point of the fiber tip 11 relative to the laser 12 resulting in the Gaussian-like distribution shown. In both FIGS. 2 and 3, the points of maximum coupling efficiency, i.e., maximum power output from laser module 10, are denoted by A and B, respectively.

Figure 4:
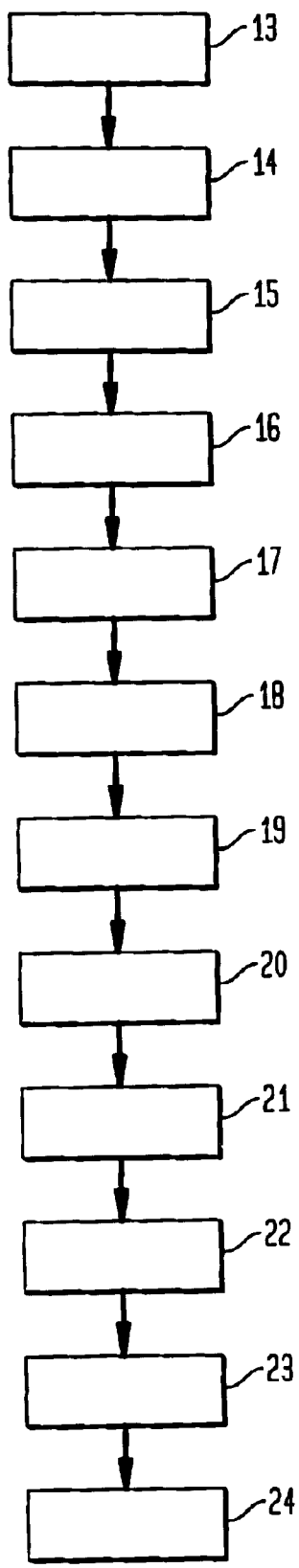
FIG. 4 shows a flowchart of an exemplary embodiment of the method for testing the quality and reliability of fiber-optic laser modules according to this invention.

As shown in flowchart form in FIG. 4, the method of the present invention operates as follows. At step 13, a plurality of contours of power are determined for the focal point of fiber tip 11 and laser 12. At step 14, a plurality of influence coefficients are determined for module 10. At step 15, the coupling efficiency of laser module 10 is measured for a particular current input to the module 10. At step 16, the influence coefficients are used to correlate the measurement of the coupling efficiency taken at step 15 to the position of the focal point of fiber tip 11 along a first corresponding one of the plurality of power contours shown in FIG. 2. By referring to FIG. 2 and using influence coefficients determined for two planes of movement, i.e., x and y, the position of the focal point of fiber tip 11 along any one of the power contours can be determined. By contrast, using influence coefficients determined for a single plane of movement, i.e., either x or y, will only enable the position of the focal point of fiber tip 11 to be determined to be a definite point or its mirror image along a power contour.

At step 17, laser module 10 is burned-in. At step 18, laser module 10 is elastically deformed in the x plane and the resulting change in coupling efficiency is measured. At step 19, laser module 10 is elastically deformed in the y plane and the resulting change in coupling efficiency is measured. The foregoing deformations can be either static or dynamic in nature. At step 20, the influence coefficients are used to correlate the measurements of the coupling efficiency taken at steps 18 and 19 to the position of the focal point of fiber tip 11 along a second corresponding one of the plurality of power contours shown in FIG. 2. The first and second power contours corresponding to the measurements of coupling efficiency taken at steps 15 and 19, respectively, will be different, representing displacement of the focal point of fiber tip 11 relative to the laser 12. At step 21, the influence coefficients are used to determine the position of the focal point of fiber tip 11 along one of the plurality of power contours in FIG. 2, and thus its position relative to laser 12.

At step 22, steps 18–21 are periodically repeated while laser module 10 continues to be burned-in. These steps can be repeated as frequently or infrequently as desired, and the burn-in can be of any desired duration. If during the burn-in, the position of the focal point of fiber tip 11 is determined to be moving relative to laser 12 at an unacceptable rate of displacement, the laser module 10 will be deemed likely to malfunction and will not be used. At step 23, the burn-in is completed.

At step 24, steps 18–21 are performed one last time as a post burn-in test If this last test reveals the focal point of the fiber tip 11 to be moving relative to the laser 12 at an acceptable rate of displacement, the laser module 10 is deemed acceptable for use.

Since the method of the present invention can determine which fiber-optic modules are likely to malfunction despite having an acceptable coupling efficiency reading during a burn-in, it provides a more reliable method for testing the quality and reliability of such modules than do conventional methods which simply analyze the change in coupling efficiency. The method of the present invention can be implemented by deforming laser module 10 in one (x), two (x and y), or three (x, y and z) planes of movement.

Laser module 10 is deformed using the present method by applying torsioning and/or flexing forces to either the case 25, snout 26 or legs 27 of the module 10. However, since the snout 26 and legs 27 are relatively fragile and can be damaged by the application of such forces, it is preferable to deform the case 25. Also, laser module 10 is only elastically deformed since the application of forces are not intended to effect a permanent change in the position of the focal point of fiber tip 11 relative to the laser 12.

The method of the present invention can be used to test an entire lot of fiber-optic laser modules or only a representative sample of modules. Ideally, the first time a particular type of module is fabricated, the entire lot of modules will be tested using this method to determine an acceptable range of measurement for the displacement of the focal point of the fiber tip relative to the laser. Thereafter only a representative sample of each subsequent lot of that particular type of module need to be tested in order to determine whether the entire lot is acceptable for use.

Numerous modifications to and alternative embodiments of the present invention will be apparent to those skilled in the art in view of the foregoing description. Accordingly, this description is to be construed as illustrative only and is for the purpose of teaching those skilled in the art the best mode of carry out the invention. Details of the structure may be varied substantially without departing from the spirit of the invention and the exclusive use of all modifications which come within the scope of the appended claims is reserved.

I claim:

1. A method for quality and reliability assurance testing of fiber-optic laser modules, comprising the steps of:

determining a first coupling efficiency for a laser module;

correlating the first coupling efficiency to a first one of a plurality of previously determined contours of power along which the focal point of the fiber tip of the laser module is positioned;

deforming the laser module;

determining a second coupling efficiency for the laser module resulting from the deformation;

correlating the second coupling efficiency to a second one of the plurality of previouly determined countours of power along which the fiber tip is positioned;

using a plurality of previously determined coupling efficiencies for the laser module to determine the position of the fiber tip along the second one of the plurelaty of previously determined contours of power and thus the position of the focal point of the fiber tip relatives to the laser, wherein if the position of the focal point of the fiber tip changes relative to the laser at a predetermined rate of acceptable displacement the laser module is deemed reliable and can therefore be used.

2. The method according to claim 1, wherein the laser module is cycled through a thermal burn-in before it is deformed.

3. The method according to claim 2, wherein the laser module is periodically deformed during the burn-in, and the position of the focal point of the fiber tip relative to the laser is determined after each such deformation to determine whether the laser module is reliable and can therefore be used.

4. The method according to claim 3, wherein the position of the fiber tip relative to the laser is determined after the burn-in is completed to determine whether the laser module is reliable and can therefore be used.

5. The method according to claim 2, wherein the burn-in can be of any desired duration.

6. The method according to claim 3, wherein the laser module is deformed as frequently as desired.

7. The method according to claim 1, wherein the laser module is deformed in one plane of movement.

8. The method according to claim 1, wherein the laser module is deformed in two planes of movement.

9. The method according to claim 1, wherein the laser module is deformed in three planes of movement.

10. The method according to claim 1, wherein the laser module is elastically deformed.

11. The method according to claim 10, wherein the deformation is static in nature.

12. The method according to claim 10, wherein the deformation is dynamic in nature.

13. The method according to claim 1, wherein the coupling efficiency is coupled to a corresponding one of the previously determined plurality of power contours by visual inspection.

14. The method according to claim 1, wherein the coupling efficiency is coupled to a corresponding one of the previously determined plurality of power contours by finite element analysis.

15. The method according to claim 1, wherein the module includes a case and a snout.

16. The method according to claim 15, wherein the module is deformed by torsioning the case.

17. The method according to claim 15, wherein the module is deformed by flexing the case.

18. The method according to claim 15, wherein the module is deformed by torsioning the snout.

19. The method according to claim 15, wherein the module is deformed by flexing the snout.

20. A method for quality and reliability assurance testing of fiber-optic laser modules, comprising the steps of:

determining a plurality of contours of power for a laser module;

determining a plurality of influence coefficients for the laser module;

determining a first coupling efficiency for a laser module;

correlating the first coupling efficiency to a first one of the plurality of contours of power along which the focal point of the fiber tip of the laser module is positioned;

deforming the laser module;

determining a second coupling efficiency for the laser module resulting from deforming the laser module;

correlating the second coupling efficiency to a second one of the plurality of contours of power along which the fiber tip is positioned;

using the plurality of influence coefficients to determine the position of the focal point of the fiber tip along the second one of the plurality of contours of power and thus the position of the focal point of the fiber tip relative to the laser, wherein the laser module is deemed reliable and can be used if the focal point of the fiber tip has been displaced relative to the laser within a predetermined rate of acceptable measurement.

* * * * *